(12) United States Patent
Johnston-Dhuet et al.

(10) Patent No.: US 7,556,739 B1
(45) Date of Patent: Jul. 7, 2009

(54) UNDERWATER PROCESSING OF FLUID STREAMS

(75) Inventors: Anna M. Johnston-Dhuet, Sugar Land, TX (US); Giovanni Occhipinti, Katy, TX (US)

(73) Assignee: Amcol International Corporation, Hoffman Estates, IL (US)

( * ) Notice: Subject to any disclaimer, the term of this patent is extended or adjusted under 35 U.S.C. 154(b) by 0 days.

(21) Appl. No.: 12/027,764

(22) Filed: Feb. 7, 2008

(51) Int. Cl.
*C02F 3/00* (2006.01)

(52) U.S. Cl. .................. 210/664; 210/681; 210/683; 210/689; 210/693; 210/694

(58) Field of Classification Search .............. 210/664, 210/681, 683, 689, 690–694, 800, 170.01
See application file for complete search history.

(56) References Cited

U.S. PATENT DOCUMENTS

| | | | |
|---|---|---|---|
| 3,656,307 A * | 4/1972 | Mott | 405/195.1 |
| 4,965,889 A * | 10/1990 | Chao et al. | 95/96 |
| 5,927,901 A | 7/1999 | Graves et al. | |
| 6,398,966 B1 * | 6/2002 | Smith et al. | 210/691 |
| 7,051,804 B1 * | 5/2006 | Arning | 166/97.1 |
| 2008/0128343 A1 * | 6/2008 | Garti | 210/167.16 |
| 2008/0135494 A1 * | 6/2008 | Usher | 210/747 |

* cited by examiner

*Primary Examiner*—Chester T Barry
(74) *Attorney, Agent, or Firm*—Marshall, Gerstein & Borun LLP

(57) ABSTRACT

A method of treating a fluid stream underwater comprising integrally attaching a skid to a fluid stream treating vessel so that the fluid stream treating vessel can be disposed on an underwater floor in a position such that an opening in said vessel is at a highest point on said vessel when disposed on the underwater floor; remotely directing a fluid stream treating vessel to an underwater floor location sufficiently close to said fluid stream so that the fluid stream can be remotely attached in fluid communication with said fluid stream treating vessel; remotely connecting said underwater fluid stream to said fluid stream treating vessel for treatment of said fluid stream; treating said fluid stream by contact with a treatment media disposed within said treatment vessel, maintained at equilibrium water pressure at the depth of treatment; and flowing the treated fluid stream out of said treating vessel.

32 Claims, 3 Drawing Sheets

UNDERWATER PROCESSING OF FLUID STREAMS

FIELD OF THE INVENTION

The present invention is directed to methods and apparatus for remotely processing fluid streams, particularly at great depths on a river, lake, or ocean floor, for example, process streams created during the recovery of oil, water and/or natural gas from sub sea locations.

BACKGROUND

The increasing cost of oil and natural gas and this country's dependence on supplies of oil from foreign sources has resulted in it becoming more cost effective and more politically desirable to explore for oil and gas in areas that were not previously cost effective—particularly in ocean floor areas under thousands of feet of sea water. Such deep sea exploration and recovery of oil and gas and the future potential to explore for fresh water in undersea areas has increased the need for specialized equipment capable of remotely performing sub sea tasks using remotely operated vessels (ROVs) capable of performing tasks at sea floor locations that are thousands of feet under the sea at the extreme pressures encountered at such depths.

Remotely operated underwater vehicles (ROVs) are the common accepted name for tethered underwater robots in the offshore industry. ROVs are unmanned, maneuverable and operated by a person aboard a boat/ship or platform. They are linked by a tether (sometimes referred to as an umbilical cable), a group of cables that carry electrical power, video and data signals back and forth between the operator and the vehicle. High power applications will often use hydraulics in addition to electrical cabling. Most ROVs are equipped with at least a video camera and lights. Additional equipment and tools are commonly added to expand the vehicle's capabilities. These may include sonars, magnetometers, a still camera, a manipulator or cutting arm, water samplers. And instruments that measure water clarity, light penetration and temperature.

Conventional ROVs are constructed with a large floatation pack on top of a steel or alloy chassis, to provide the necessary buoyancy. Syntactic foam is often used for the flotation. A tool sled may be fitted at the bottom of the system and can accommodate a variety of sensors. By placing the light components on the top and the heavy components on the bottom, the overall system has a large separation between the center of buoyancy and the center of gravity, this provides stability and the stiffness to do work underwater.

Electrical cables may be run inside oil-filled tubing to protect them from corrosion in seawater. Thrusters are usually located in all three axes to provide full control. Cameras, lights and manipulators are on the front of the ROV or occasionally in the rear for assistance in maneuvering. An example of an ROV use underwater is disclosed in U.S. Pat. No. 5,927,901 ('901) where the ROV is used in a pipeline pigging operation. As described in the '901 patent, ROVs have been used sub-sea for extremely simple operations, such as opening of valves in pipelines to allow flow of a liquid or gas through a pipeline. The process and apparatus described herein provides for a fluid stream treating process to be carried out underwater, where such prior art treating processes were only used on land or on an above-sea platform.

One of the problems encountered in a deep sea oil and/or natural gas recovery operation is the cost of erecting a platform for processing the oil and/or gas recovered from the ocean floor. Construction of such platforms is extremely difficult and expensive, particularly when at a location far from shore. Another difficulty with off shore oil and/or gas exploration is that EPA regulations are very strict in allowing essentially no hydrocarbons or other contaminants to be released into the ocean water. These EPA regulations make it very difficult to recover hydrocarbons, e.g., oil and/or gas, from the ocean floor since the recovered hydrocarbons, at extreme ocean depths, contain water that quickly corrodes piping used to convey the recovered hydrocarbons up to a platform or shore processing location. In addition, any device deployed at great ocean depths is subjected to extreme pressures and cannot have any trapped gas inside, e.g., air, since at the pressure encountered under thousands of feet of ocean water, the vessel would implode. Further, the installed piping initially is treated with a variety of inorganic and organic chemicals, such as corrosion inhibitors, scale inhibitors, and preservation fluids to prevent bacteria from growing and scale and rust from forming during the recovery operation. These chemicals cannot be discharged to the ocean due to EPA regulations. It would be extremely desirable to treat fluid streams underwater at a floor of a river, lake or ocean, particularly at thousands of feet under sea water, on an ocean floor, to treat, e.g., separate and remove undesirable contaminants and treating chemicals from recovered oil, gas, and/or water process streams.

The apparatus, hereinafter sometimes called "NEMOH™," and methods described herein are directed to a fluid stream treatment method that can be remotely operated to treat a fluid stream with a reaction or separation media underwater, particularly on the ocean floor, preferably at a depth of at least 500 feet (at a treatment vessel pressure of at least 237 psi), e.g., 1,000 to 10,000 feet at treatment vessel pressures of 455 psi to 4,480 psi, preferably 2,000 to 6,000 feet at treat vessel pressures of 910 psi to 2,696 psi, e.g., filter out contaminants such as water or a chemical additive, such as a corrosion inhibitor, scale inhibitor and/or a preservation fluid from a recovered hydrocarbon or water stream under water, particularly at a depth of thousands of feet under water.

SUMMARY

NEMOH™ is a pressure equalized underwater fluid stream treatment media-containing vessel. It is a vessel designed to host a treatment material (media) for processing a fluid stream underwater. It is designed to be a temporary vessel that then could be set at one location and recovered and moved from location to location sub sea performing fluid processing until maintenance is needed. It can be used in shallow water and at depths over 6000 feet. It can be operated in fresh, brackish or saltwater environments.

The NEMOH™ vessel is designed to have one or more, preferably two or more pressure equalization openings oriented in an upward direction to allow potential entrained gases to escape during deployment and recovery. More openings may be used based on the size of the vessel and the type of media used in the vessel. Specific procedures are needed to safeguard that the openings are not blocked at any time during deployment and recovery, especially if sampling devices, chemical injection valves or ports, meters, screens, or a combination of these items are attached to these pressure equalization lines. These openings may be dual purpose and used during the treatment process as an inlet or outlet or may be dedicated pressure equalization openings that serve as inlets and outlets.

DETAILED DESCRIPTION OF THE PREFERRED EMBODIMENT

Typical Deployment/Operation

The NEMOH™ remotely operated fluid stream treatment vessel is typically outfitted with a protective cage having a lifting frame, as well as a mud mat or skid incorporated into the protective lift frame weldments. One or more NEMOH™ remotely operated fluid stream treatment vessels may be put into a cage. The NEMOH™ goes through inspection and overboard preparation. This overboard preparation involves following specific overboard procedures which involve checking all valve (open) positions, adding the media into the vessel, e.g., activated carbon or organophilic clay, pre-filling the vessel and pre-soaking vessel-contained media with water, purging air out with water, and adding the treatment media, e.g., organophilic clay. The NEMOH™ apparatus is positioned so that a ship crane can lower the vessel below the ship deck until sighted with an ROV. Once in sight of the ROV, the ROV will take over direction. The ROV operators will take over the direction of the winch and the movement of the NEMOH™ to ensure that the skid has a safe landing on the bottom of the ocean. Once landed, the winch wire is disconnected and recovered to the surface.

Figure 1:
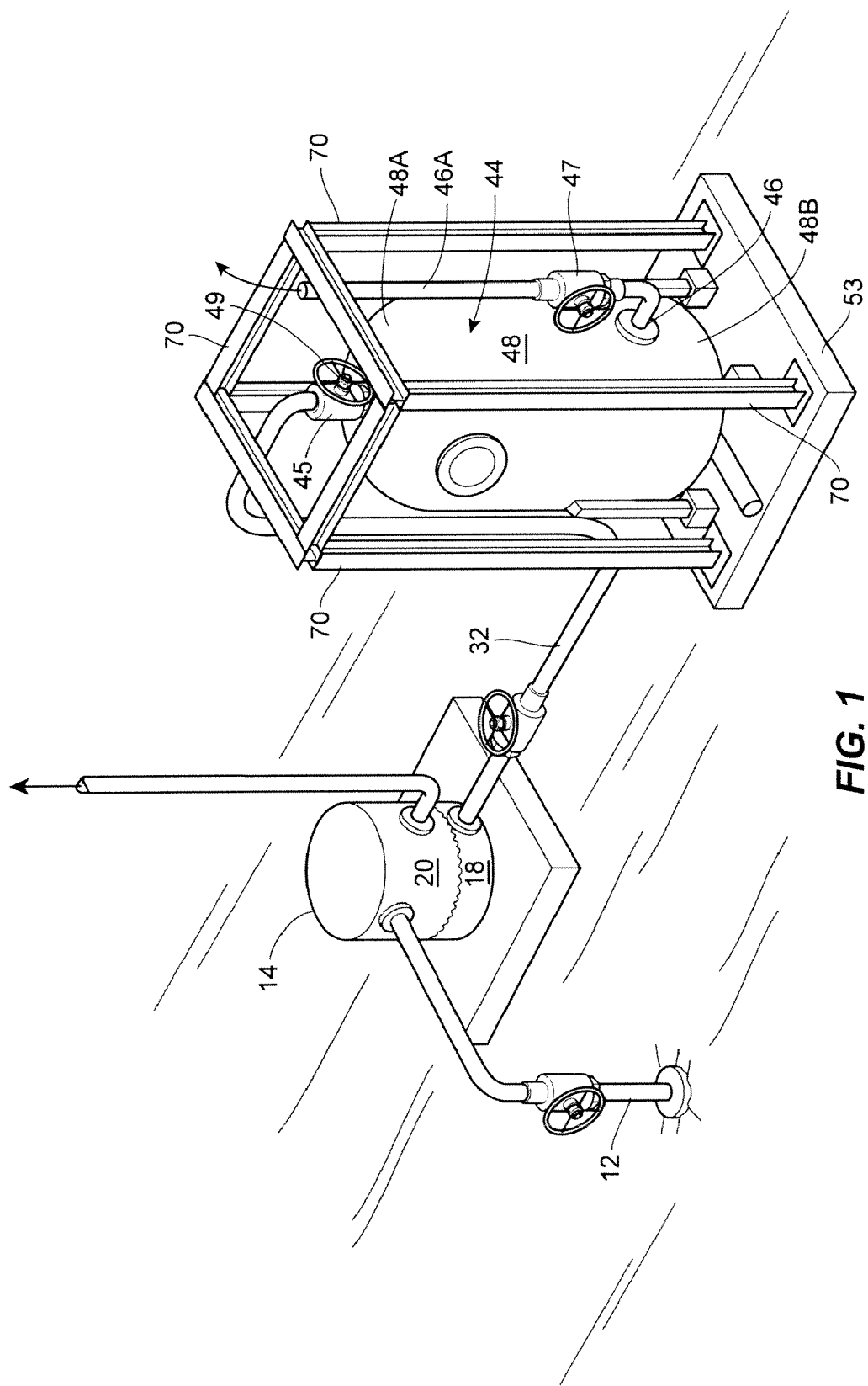
FIG. 1 is a perspective view of an under sea filtration process, including a first basic oil/water separation device followed by a NEMOH™ device for separating remaining oil and/or gas contaminants from the water stream so that the water can be returned to the sea.

The ROV will use its manipulators which can be claw like arms or can have specially designed tools attached to connect a process stream to the NEMOH™ inlet. The ROV will connect one or more conduits containing a process stream to be treated to a NEMOH™ stream inlet port, by a means such as a hot stab or quick couple hose line. Then the ROV may swim to the outlet of the NEMOH™ to connect the outlet of the NEMOH™ to additional process equipment, if necessary, such as a Pipeline End Termination (PLET) by a means such as a hot stab or quick couple connector. All NEMOH™ equalization valves are then closed so that the path of flow will be through the inlet and outlet of the NEMOH™ vessel only. Valve positions on both the outlet process such as a PLET and on the NEMOH™ will be positioned correctly. The NEMOH™ is ready to receive fluids. The same process may be done on the downstream of NEMOH™ if the valves are installed for outlets going to further processing, sampling devices, or into other equipment or pipelines. Otherwise, the NEMOH™ may have an open ended outlet, as shown in FIG. 1. The valves on the vessel can be fitted with traditional valves for diver operation or retrofitted with valves and hot stabs for ROV operation. In some cases to prevent inadvertent closing of valves during deployment and recovery, no valves will be installed on inlets and outlets.

When the treatment process is complete, the NEMOH™ may/can be recovered in a reverse process or can be disconnected or the ROV can guide the NEMOH™ using the ship winch, along the sub sea floor to another location for another application. In some applications it is preferred that clean water be flowed through the NEMOH™ before recovery.

Figure 2:
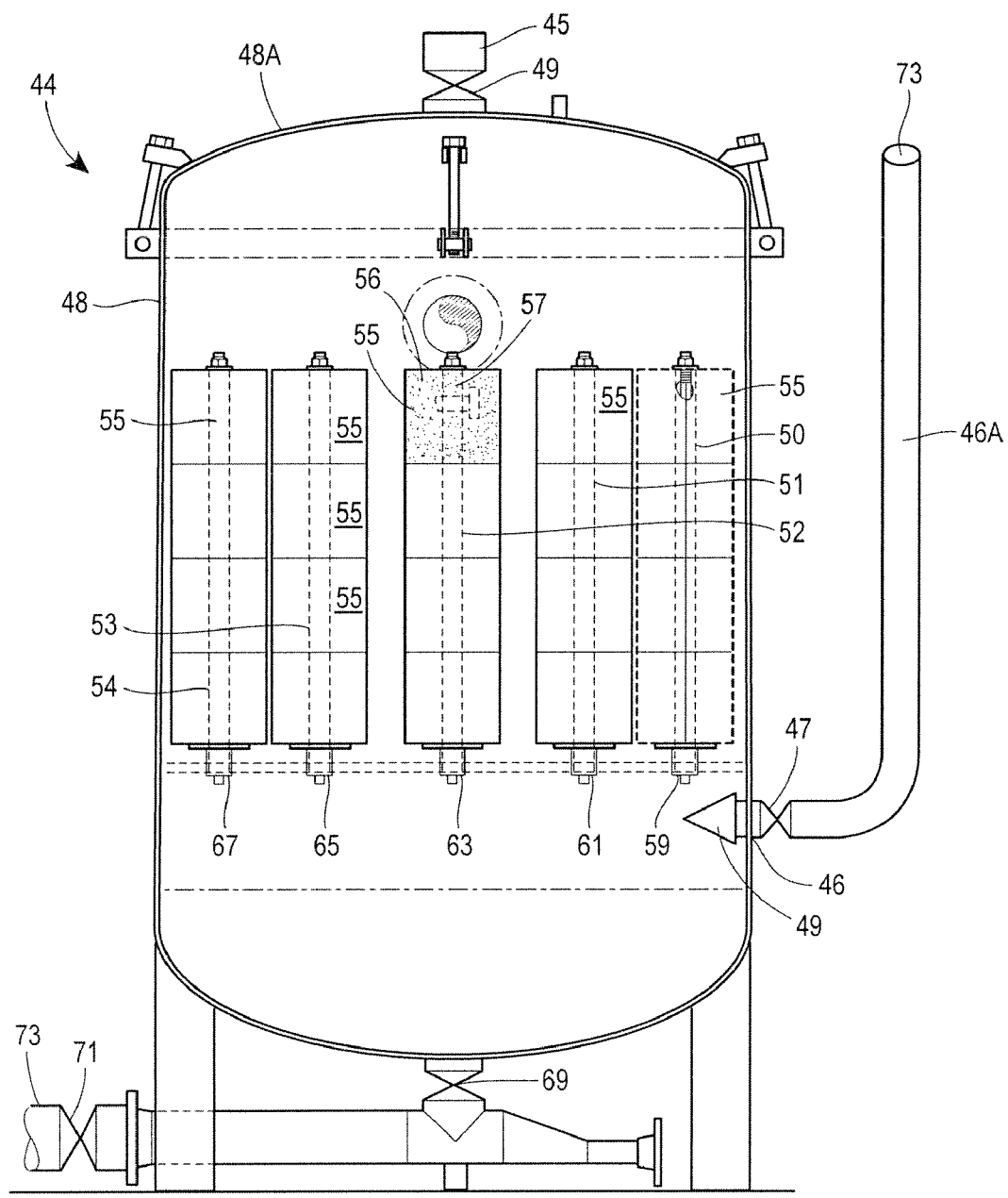
FIG. 2 is a cross-sectional side view of the NEMOH™ device of FIG. 1, wherein a treatment media, e.g., organophilic clay, is contained within canisters.

In the preferred embodiment, NEMOH™ is used as a secondary separation device, for example for separating oil from water that was previously removed from the recovered crude oil via a primary separation device and method, such as by gravity or centrifuge. Oil that is recovered from below a sea bed generally contains water as a primary contaminant and the water is separated via phase separation, gravity separation, centrifugal separation, or some other primary process that is remotely operated from ship, platform or shore. The separated water phase contains a quantity of oil that cannot be discharged to the ocean and meet EPA regulations. The NEMOH™ device described herein is remotely operated via ROV to remove almost all of the oil remaining in the water phase so that the water can be discharged to the ocean and meet EPA regulations. The oil separated from the water phase is captured in a media contained within the NEMOH™ apparatus and periodically the oil-laden media is replaced with fresh media. The media of choice in this preferred embodiment is an organophilic clay that can be contained in bulk or may be contained within cartridges, as shown in FIG. 2, and in the assignee's issued patents, for example U.S. Pat. No. 6,398,966, hereby incorporated by reference. Another preferred media is activated carbon.

Canister media, as shown in FIG. 2, is useful for long term applications where extra inventory can be stored on a ship/boat to change out media with out having to send a media vessel in for maintenance.

Media can be made up of various materials depending on the constituents to be removed, oxidized, coalesced, neutralized or a combination of these processes.

The typical medias may be Granulated Activated Carbon (GAC), a mixed media bed, organo-clay CrudeSorb™, polymeric media, cellulose media, silica based media or a combination of the medias mixed or layered in bulk or in canisters. Bulk media may be contained with large screens, plates with small holes or diverters on the inlet, outlets and equalization ports. When screens and such items are utilized, additional equalization openings are used in case of inadvertent blockage of these screens after usage. This is especially important for during vessel recovery. A critical aspect of the vessel design is to allow degassing of the media during descent and ascent journeys.

The NEMOH™ media host objective is to remove, oxidize, coalesce, neutralize, react or making less or not harmful, or a combination of these processing steps to treat or remove contaminant or undesirable substances that are dissolved or suspended in the fluid being treated. The fluid stream may treated through the NEMOH™ apparatus in an open ended process, where the contaminant, e.g., water can be released to the ocean or NEMOH™ can be connected in a sub sea process where the fluid stream is flowing in a closed system that includes the NEMOH™ apparatus.

For discharges open to the environment, typical contaminant materials found in oil and/or gas production, drilling and commissioning activities that the media be utilized to remove, oxidize, coalesce, neutralize to include the following: arsenic; antioxidants (hindered phenols based, phenyl diamine); biocides (such as glutaraldehde, tetrakis(hydroxymethyl)phosphonium sulfate), or materials that have inherent biocidal characteristics; BTEX components (benzene, toluene, ethylbenzene, and xylene); corrosion inhibitors (organic acid based, imidazoline, cationic amines, nitate based, sulfonates, filmers that are surfactant based, amine based such as ethylenediamine, imidazoline, cationic amines, and phosphate ester based); demulsifiers, and emulsion breakers (such as oxalkylated resins and poly glycols, alkylaryl sulfonate based); dyes (fluoresine, xanthene); oxygen scavengers (ammonium bisulphate); suspended and water soluble organics; metals (such as zinc, lead, mercury); refined products (such as diesel, gasoline, hydraulic oil, lubricant oil, triethylamine); hydrocarbons (such as crude oil and condensate); residual equipment treatment (such as point in filmers); storage fluids/preservations fluids (fluids containing glycol, methanol in combination with other chemicals); other chemical treatment such as but not limited to hydrate inhibitors (alkyl ether and alkylpyridine based), paraffin inhibitors, pour point depressants (ethylvinyl acetate copolymers, High MW ester based, methylethyleneketone), asphaltene inhibitors; dispersants and surfactant (such as alcohol ethoxylates, glycol ether, and dodecylbenzenesulfonic acid based); passivators; cleaning products (such as succamide based, sodium hypochlorite, d-lemonene); acid; caustic; viscosity improvers (such as polyisobutylene, olefin and polymethacrylate based); waste stream products.

The media may be designed to treat or remove a specific contaminant or fluid stream component, or a combination of constituents depending on the application and the media used. Different media may be utilized in series to treat a specific contaminant or a combination of contaminants.

The NEMOH™ apparatus can be used for removal or treatment of any of the above listed contaminants also in a closed loop system to protect an oil and/or gas formation such as for re-injection; as part of a process to protect downstream equipment, or simply to treat a process stream, sub sea or on land NEMOH™ may be operated as a stand alone vessel (single pass) or in combination in series (multi-pass) with additional vessels for fluid with high levels or multiple constituents desired to be processed.

Rates, Capacity and Sizes

NEMOH™ contaminate capacity (to remove, oxidizing, coalescing, neutralizing or making less or not harmful constituents) is variable and is based on the material makeup, concentration, flow rate for treatment time.

Example 1

For a bulk granulated activated carbon (GAC) loaded host, it is expected that a (GAC) absorbs 5%-20% by weight of the GAC in the vessel in a 1 barrel per minute (BPM) flow rate is expected for the removal of typical new pipeline chemically treated fluids is expected.

Example 2

For a bulk CrudeSorb™ media loaded host, it is expected to adsorb 1%-50% by weight of the CrudeSorb™ media in the vessel of a line containing suspended total petroleum hydrocarbons less than 200 ppm at rates less than 1 BPM.

The NEMOH™ can be of various sizes dependent on the application. The typical NEMOH™ size:

| Item | Dry Weight | Length | Width | Height | Oper. Weight |
|---|---|---|---|---|---|
| OS 72 (Loaded - 2000# media) | 4,000 | 4'4" | 4'4" | 7'5" | 6,400 |

This size has been selected for the ease of operation during deployment for a boat crane and for boat space footprint. The flow rate is typically 1-2 barrel per minute and is dependant on the media, fluid quality and composition.

Multiple NEMOHs™ can be manifolded together to address higher flow rates or a larger vessel can be used.

Most Common NEMOH™ Applications

Pressure testing: Some typical applications for NEMOH™ for pressure testing equipment. During installation of new equipment, the equipment integrity needs to be verified. Connections, seals, valves, and lines all need to be checked for leaks. This is routinely done by pressure testing the lines. This is accomplished by filling the equipment up with water which often is chemically treated to protect the equipment from corrosion. These chemicals (biocides, corrosion inhibitors, oxygen scavengers) can be inherently toxic to the environment. There are strict regulations in the Gulf of Mexico as well as other EPA—controlled waterways, strictly limiting contaminants carried by the pressure treatment water being discharged to the ocean water. Each state has regulations for inland waters and for federal waters there are the EPA regulations.

After this equipment is filled, additional water is pumped into the equipment until a desired pressure is held. The pressure is held and charted for variances. If all is well the equipment is depressurized. This excess fluid can be captured and treated through a NEMOH™ to ensure there is no harmful release to the environment that is not treated.

This hydrostatic testing can be done for risers, pipelines, manifolds and other equipment that needs to be integrity tested. This is typically done during new installation or if maintenance has had to be done on a process section where a new component needs to be evaluated in a system. In cases where the equipment has been in use there may be additional contaminants such as oil and grease, entrained gas, production chemicals, maintenance chemicals, or the like.

Over Flushing

When equipment is being replaced, repaired, or modified, preservation fluids may be in place. As the system is opened on purpose or inadvertently (such as hurricane damage) sea water my enter the line or system. The sea water may then be pumped out of the sea water-containing equipment while ensuring that all sea water is displaced with preservation fluids, oil or other fluid. The pumped out fluids may then be collected and/or processed.

Turning now to FIG. 1 there is shown an underwater oil/water well pipe 12 that is initially directed through a gravity separation tank 14 for gravity separation of a lower level of water 18 from a floating layer of oil 20. The water 18, containing hydrocarbon (oil) and/or other contaminants is conveyed through a separation tank water outlet conduit 32 disposed near a bottom of the separation tank 14.

In accordance with an important feature of the present invention, water outlet conduit 32 is remotely connected by ROV to be in fluid communication with an inlet 45 of one or more NEMOH™ treatment vessels 44 containing a volume of treatment media, for example, an oil adsorbent, particularly an organophilic clay. The separated water flows through separation tank 14 water outlet conduit 32 and is conveyed through conduit 32 into treatment vessel 44 at the treatment vessel inlet conduit 45. The organophilic clay within treatment vessel 44 adsorbs the hydrocarbons, oil and other organic materials entrained with the water flowing through conduit 32 for essentially complete hydrocarbon removal (less than about 10 parts per million, preferably less than about 1 part per million organics after organophilic clay treatment). The treated water flows through treated water exit opening 46 in the treatment vessel 44 and through exit conduit 46A back to the ocean water 14.

Figure 3:
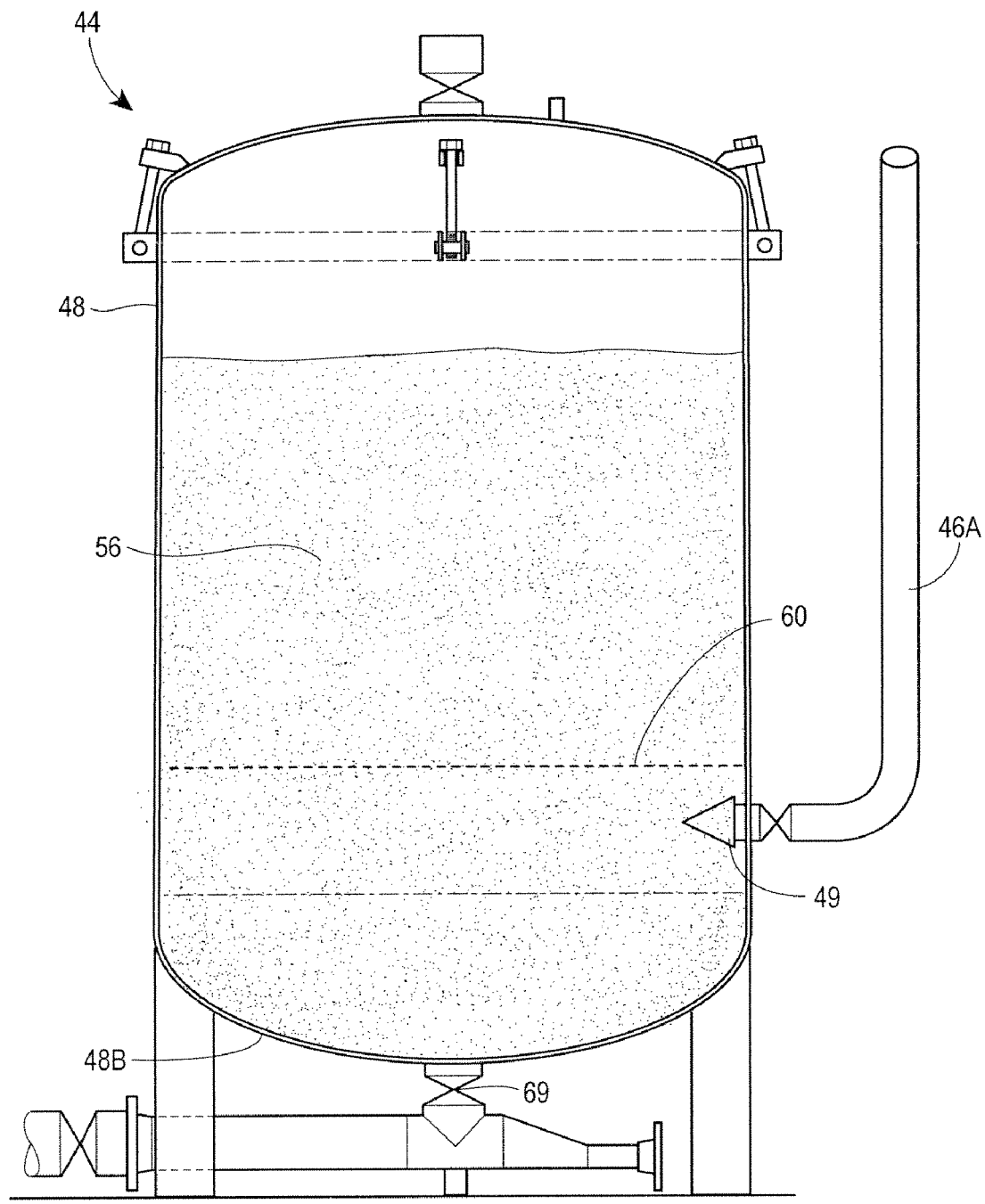
FIG. 3 is a cross-sectional side view of the NEMOH™ device of FIG. 1, wherein the NEMOH™ device contains a bulk loading of treatment media.

As shown in the embodiment of FIG. 2 the treatment vessel 44 includes an outer, fluid-impermeable housing 48 having a process stream inlet 45 and valve 49 interconnected through the housing 48 so that the process stream, e.g., contaminated water, enters the treatment vessel 44 and then, as shown in FIG. 2, enters individual organophilic clay-containing vessels or cartridges 55, from outside surfaces of the cartridges 55. Alternatively, as shown in FIG. 3, the vessel 44 can be filled with bulk treatment media 56. The organophilic clay-containing cartridge 55 is water-permeable by virtue of having water flow apertures (not shown) that are sized sufficiently small such that organophilic clay granules do not pass therethrough. Water entering the treatment vessel 44 through water inlet conduit 45 flows radially inwardly into longitudinal, axial, central conduits 50, 51, 52, 53 and 54, each containing treated water exit openings for the organophilic clay-treated water. Organophilic clay contained in cartridges 55 adsorbs any oil and organics contained in the water and the clean water exits through exit openings 59, 61, 63, 65 and 67 in each stack of cartridges 55 and the clean water collectively exits the treatment vessel 48 through exit opening 46 and flows through valve 47 and conduit 46A and may be returned to the ocean, as shown in FIG. 1, or the outlet conduit 46A may be connected to another process device, e.g., another NEMOH™, via ROV for further processing.

In accordance with one embodiment of the underwater processing methods and apparatus described herein, the treatment media functions excellently when loaded into the treatment vessel 44 in bulk, as shown in FIG. 3. As described above, before submerging the treatment vessel 44, the NEMOH™ vessel 44 is charged with bulk treatment media, e.g., organophilic clay 56, and the vessel and its treatment media is thoroughly wetted with shore drain valve 69 (FIGS. 2 and 3) closed so that any gas contained with the vessel will rise to escape through inlet conduit 45, disposed at the highest point of a top 48A of the NEMOH™ vessel 44. Some gas may also escape through the treated stream outlet opening 46 since valve 47 in outlet conduit 46A is opened during wetting of treatment media and degassing of the NEMOH™ treatment vessel 44 prior to submerging the vessel 44. A fine mesh screen or filter cap 49 is fitted over outlet opening 46 in conduit 46A to prevent bulk treatment media from being lost through the outlet opening 46 and conduit 46A. Alternatively, a fine mesh plate or screen 60 (FIG. 3) can be secured to an inside circumference along a horizontal plane inside the vessel 44, above the outlet opening 46 in conduit 46A to prevent treatment media 56 from being lost through the outlet opening 46 in conduit 46A.

The wetted and de-gassed NEMOH™ treatment vessel 44, on planar skid 53, and preferably protected from ROV collision damage by frame structure 70, then is lowered by cable from ship or platform down to the waterway, e.g., ocean, floor, as shown in FIG. 11, with the valves 49 and 47 in uppermost conduit 45 and outlet conduit 46, respectively, open to allow for the escape of gas and for water to enter the NEMOH™ vessel 44 during its downward journey into deeper water so that gases are released through conduits 45 and 46, and pressure is equalized within the outside of the NEMOH™ vessel, regardless of its depth.

Surprisingly, the treatment media 56 does not escape from the NEMOH™ vessel through open vessel inlet conduit 45 while the NEMOH™ vessel descends to the ocean floor. It is theorized that the substantial water pressures placed on the treatment media 56 during the descent of the NEMOH™ vessel 44 densifies the treatment media at the lower portion 48B of the NEMOH™ vessel 44 enabling the treatment process described herein, at great depths, since the process is carried out at ambient conditions at the ocean or lake floor.

What is claimed is:

1. A method of treating a fluid stream underwater with a treatment media contained in a treatment vessel comprising:
   degassing the treatment media and treatment vessel;
   remotely directing a fluid stream treatment vessel to an underwater floor location sufficiently close to said fluid stream so that the fluid stream can be remotely attached in fluid communication with said fluid stream treatment vessel;
   remotely connecting said underwater fluid stream to said fluid stream treatment vessel for treatment of said fluid stream;
   treating said fluid stream by contact with a treatment media disposed within said treatment vessel, maintained at equilibrium water pressure at the depth of treatment; and
   flowing the treated fluid stream out of said treatment vessel.

2. The method of claim 1, further including flowing the treated fluid stream out of said treatment vessel and into the surrounding water.

3. The method of claim 1, wherein degassing is achieved by pre-wetting the treatment media in said treatment vessel and flowing water through said treatment vessel to remove essentially all gas from the treatment vessel prior to directing the fluid stream treatment vessel to the underwater floor location.

4. The method of claim 1, wherein the fluid stream treatment vessel is maintained at a pressure of at least 237 psi.

5. The method of claim 4, wherein the fluid stream treatment vessel is maintained at a pressure of 455 psi to 4,480 psi.

6. The method of claim 5, wherein the fluid stream treatment vessel is maintained at a pressure of 910 psi to 2,696 psi.

7. The method of claim 1, wherein the fluid stream treatment vessel includes a skid integrally attached thereunder so that the fluid stream treatment vessel can be disposed on an underwater floor in a position such that an opening in said vessel is at a highest point on said vessel when disposed on the underwater floor.

8. The method of claim 1, including the step of remotely directing the treated fluid from said treatment vessel to an inlet of another treatment vessel.

9. The method of claim 1, wherein the treatment vessel contains a treatment media selected from the group consisting of a contaminant reactant, a material capable of coalescing a suspended hydrophobic or hydrophobic material; an oxidizer; a neutralization material; a material capable of absorbing or adsorbing a fluid stream contaminant; and a combination thereof.

10. The method of claim 1, wherein the treatment media is selected from the group consisting of granular activated carbon, granulated organophilic clay; an ion-exchange resin; a filter media; silica-based granules; and a mixture or combination thereof.

11. The method of claim 1, wherein the fluid stream contains a contaminant that is treated in the treatment vessel, said contaminant selected from the group consisting of an antioxidant; arsenic; a biocide; benzene; toluene; ethylbenzone; xylene; a corrosion inhibitor; a de-emulsifier; a dye; an oxygen scavenger; zinc; lead; mercury; diesel fuel; gasoline; hydraulic oil; lubricant oil; triethylamine; crude oil; oil condensate; a film former; a hydrate inhibitor; a paraffin inhibitor; a pour point depressant; an asphaltene inhibitor; a dispersant; a surfactant; an acid; a caustic material; a viscosity modifier; a waste stream product; and mixtures or combination thereof.

12. The method of claim 11, wherein the antioxidant is a hindered phenol or a phenyldiamine; wherein the biocide is glutaraldehde or tetrakis (hydroxymethyl/phosphonium sulfate; wherein the corrosion inhibitor is selected from the group consisting of organic acid based; imidazoline; a cationic amine; nitrate-based; a sulfonate; ethylene-diamine; imidazoline; and mixtures or combinations thereof; wherein the dye is selected from fluoresine and xanthan dyes; wherein the oxygen scavenger is ammonium bisulfate; wherein the zinc, lead or mercury are suspended or solubilized; wherein the preservation fluid includes a glycol, methanol, or a combination thereof; wherein the hydrate inhibitor is an alkylether or an alkyl-pyridine-based material; wherein the pour point depressant is selected from the group consisting of an ethylvinyl acetate copolymer, ester-based; and methylethylketone; wherein the dispersant or surfactant is selected from the group consisting of an alcohol, an ethoxylate; a glycol ether; dodecylbenzene-sulfonic acid; and mixtures thereof; wherein the viscosity modifier is selected from the group consisting of polyisobutylene; an olefin; and a polymathacrylate.

13. The method of claim 1, wherein the fluid stream treatment vessel is remotely connected in a closed loop treatment system.

14. The method of claim 1, wherein the fluid stream treatment vessel is remotely disposed in close proximity to an underwater device that is pressure tested by filling the device with water containing a treatment chemical;
remotely connecting the water and treating chemical from the pressure-tested device into said fluid stream treatment vessel for treatment of said chemical; and
flowing the treated water out of said treatment vessel.

15. The method of claim 14, further including flowing the treated fluid stream out of said treatment vessel and into the surrounding water.

16. The method of claim 14, further including the step of pre-wetting the treatment media in said treatment vessel and flowing water through said treatment vessel to remove all gas from the treatment vessel prior to directing the fluid stream treatment vessel to the underwater floor location.

17. The method of claim 14, wherein the fluid stream treatment vessel includes a skid integrally attached thereunder so that the fluid stream treatment vessel can be disposed on an underwater floor in a position such that an opening in said vessel is at a highest point on said vessel when disposed on the underwater floor.

18. The method of claim 14, including the step of remotely directing the treated fluid from said treatment vessel to an inlet of another treatment vessel.

19. The method of claim 14, wherein the treatment vessel contains a treatment media selected from the group consisting of a contaminant reactant, a material capable of coalescing a suspended hydrophobic or hydrophilic material; an oxidizer; a neutralization material; a material capable of absorbing or adsorbing a fluid stream contaminant; and a combination thereof.

20. The method of claim 14, wherein the treatment media is selected from the group consisting of granular activated carbon, granulated organophilic clay; an ion-exchange resin; a filter media; silica-based granules; and a mixture or combination thereof.

21. A method of treating a fluid stream underwater comprising:
remotely directing a fluid stream treatment vessel to an underwater floor location sufficiently close to said fluid stream so that the fluid stream can be remotely attached in fluid communication with said fluid stream treatment vessel;
remotely connecting said underwater fluid stream to said fluid stream treatment vessel for treatment of said fluid stream;
treating said fluid stream by contact with a treatment media disposed within said treatment vessel, maintained at equilibrium water pressure at the depth of treatment said treatment media being selected from the group consisting of a contaminant reactant, a material capable of coalescing a suspended hydrophilic or hydrophobic material; an oxidizer; a neutralization material; a material capable of absorbing or adsorbing a fluid stream contaminant; and a combination thereof; and
flowing the treated fluid stream out of said treatment vessel.

22. A method of treating a fluid stream underwater comprising:
remotely directing a fluid stream treatment vessel to an underwater floor location sufficiently close to said fluid stream so that the fluid stream can be remotely attached in fluid communication with said fluid stream treatment vessel;
remotely connecting said underwater fluid stream to said fluid stream treatment vessel for treatment of said fluid stream;
treating said fluid stream by contact with a treatment media disposed within said treatment vessel, maintained at equilibrium water pressure at the depth of treatment, the treatment media being selected from the group consisting of granular activated carbon, granulated organophilic clay; an ion-exchange resin; silica-based granules; and a mixture or combination thereof; and
flowing the treated fluid stream out of said treatment vessel.

23. A method of treating a fluid stream underwater comprising:
remotely directing a fluid stream treatment vessel to an underwater floor location sufficiently close to said fluid stream so that the fluid stream can be remotely attached in fluid communication with said fluid stream treatment vessel;
remotely connecting said underwater fluid stream to said fluid stream treatment vessel for treatment of said fluid stream;
treating said fluid stream by contact with a treatment media disposed within said treatment vessel, maintained at equilibrium water pressure at the depth of treatment; and
flowing the treated fluid stream out of said treatment vessel;
wherein the fluid stream contains a contaminant that is treated in the treatment vessel, said contaminant selected from the group consisting of an antioxidant; arsenic; a biocide; benzene; toluene; ethylbenzone; xylene; a corrosion inhibitor; a de-emulsifier; a dye; an oxygen scavenger; zinc; lead; mercury; diesel fuel; gasoline; hydraulic oil; lubricant oil; triethylamine; crude oil; oil condensate; a film former; a hydrate inhibitor; a paraffin inhibitor; a pour point depressant; an asphaltene inhibitor; a dispersant; a surfactant; an acid; a caustic material; a viscosity modifier; a waste stream product; and mixtures or combination thereof.

24. The method of claim 23, wherein the antioxidant is a hindered phenol or a phenyldiamine; wherein the biocide is glutaraldehde or tetrakis (hydroxymethyl/phosphonium sulfate; wherein the corrosion inhibitor is selected from the group consisting of organic acid based; imidazoline; a cationic amine; nitrate-based; a sulfonate; ethylene-diamine; imidazoline; and mixtures or combinations thereof; wherein the dye is selected from fluoresine and xanthan dyes; wherein the oxygen scavenger is ammonium bisulfate; wherein the zinc, lead or mercury are suspended or solubilized; wherein the preservation fluid includes a glycol, methanol, or a combination thereof; wherein the hydrate inhibitor is an alkylether or an alkyl-pyridine-based material; wherein the pour point depressant is selected from the group consisting of an ethylvinyl acetate copolymer, ester-based; and methylethylketone; wherein the dispersant or surfactant is selected from the group consisting of an alcohol, an ethoxylate; a glycol ether; dodecylbenzene-sulfonic acid; and mixtures thereof; wherein the viscosity modifier is selected from the group consisting of polyisobutylene; an olefin; and a polymathacrylate.

25. A method of treating a fluid stream underwater comprising:
   remotely directing a fluid stream treatment vessel to an underwater floor location sufficiently close to said fluid stream so that the fluid stream can be remotely attached in fluid communication with said fluid stream treatment vessel;
   remotely connecting said underwater fluid stream to said fluid stream treatment vessel for treatment of said fluid stream;
   treating said fluid stream by contact with a treatment media disposed within said treatment vessel, maintained at equilibrium water pressure at the depth of treatment; and
   flowing the treated fluid stream out of said treatment vessel, wherein the fluid stream treatment vessel is remotely disposed in close proximity to an underwater device that is pressure tested by filling the device with water containing a treating chemical;
   remotely connecting the water and treating chemical from the pressure-tested device into said fluid stream treatment vessel for treatment of said chemical; and
   flowing the treated water out of said treatment vessel.

26. The method of claim 1, wherein the degassing step comprises pre-wetting the treatment media in said treatment vessel and flowing water through said treatment vessel to remove all gas from the treatment vessel prior to directing the fluid stream treatment vessel to the underwater floor location.

27. The method of claim 1, wherein the fluid stream treatment vessel includes a skid integrally attached thereunder so that the fluid stream treatment vessel can be disposed on an underwater floor in a position such that an opening in said vessel is at a highest point on said vessel when disposed on the underwater floor.

28. The method of claim 1, including the step of remotely directing the treated fluid from said treatment vessel to an inlet of another treatment vessel.

29. The method of claim 1, wherein the treatment vessel contains a treatment media selected from the group consisting of a contaminant reactant, a material capable of coalescing a suspended hydrophobic or hydrophobic material; an oxidizer; a neutralization material; a material capable of absorbing or adsorbing a fluid stream contaminant; and a combination thereof.

30. The method of claim 1, wherein the treatment media is selected from the group consisting of granular activated carbon, granulated organophilic clay; an ion-exchange resin; a filter media; silica-based granules; and a mixture or combination thereof.

31. A method of treating a fluid stream underwater, said fluid stream containing oil, natural gas, and/or water being recovered from a sub-sea location comprising:
   remotely directing a fluid stream treatment vessel to an underwater floor location sufficiently close to said fluid stream so that the fluid stream can be remotely attached in fluid communication with said fluid stream treatment vessel;
   remotely connecting said underwater fluid stream to said fluid stream treatment vessel for treatment of said fluid stream;
   treating said fluid stream by contact with a treatment media disposed within said treatment vessel, maintained at equilibrium water pressure at the depth of treatment; and
   flowing the treated fluid stream out of said treatment vessel.

32. The method of claim 31, wherein the treatment media is selected from the group consisting of granular activated carbon, granulated organophilic clay; an ion-exchange resin; silica-based granules; and a mixture or combination thereof.

* * * * *

UNITED STATES PATENT AND TRADEMARK OFFICE
CERTIFICATE OF CORRECTION

| | | |
|---|---|---|
| PATENT NO. | : 7,556,739 B1 | Page 1 of 1 |
| APPLICATION NO. | : 12/027764 | |
| DATED | : July 7, 2009 | |
| INVENTOR(S) | : Anna M. Johnston-Dhuet et al. | |

It is certified that error appears in the above-identified patent and that said Letters Patent is hereby corrected as shown below:

In the Claims:

At Column 9, line 15, "glutaraldehde" should be -- glutaraldehyde --.

At Column 9, lines 15-16, "(hydroxymethyl/phosphonium sulfate" should be -- (hydroxymethyl)phosphonium sulfate --.

At Column 9, lines 32-33, "polymathacrylate" should be -- polymethacrylate --.

At Column 11, line 9, "glutaraldehde" should be -- glutaraldehyde --.

At Column 11, lines 9-10, "(hydroxymethyl/phosphonium sulfate" should be -- (hydroxymethyl)phosphonium sulfate --.

At Column 11, lines 25-26, "polymathacrylate" should be -- polymethacrylate --.

Signed and Sealed this
Seventh Day of June, 2011

David J. Kappos
*Director of the United States Patent and Trademark Office*